US012695040B2

(12) United States Patent
Hoffmann et al.

(10) Patent No.: US 12,695,040 B2
(45) Date of Patent: Jul. 28, 2026

(54) HOUSING ASSEMBLY COMPRISING A HOUSING WITH PLUG-IN SIDE

(71) Applicant: TDK Electronics AG, Munich (DE)

(72) Inventors: Robert Hoffmann, Berlin (DE); Robert Minkwitz, Berlin (DE)

(73) Assignee: TDK Electronics AG, Munich (DE)

( * ) Notice: Subject to any disclaimer, the term of this patent is extended or adjusted under 35 U.S.C. 154(b) by 226 days.

(21) Appl. No.: 18/549,304

(22) PCT Filed: Jan. 25, 2022

(86) PCT No.: PCT/EP2022/051616

§ 371 (c)(1),
(2) Date: Sep. 6, 2023

(87) PCT Pub. No.: WO2022/189057

PCT Pub. Date: Sep. 15, 2022

(65) Prior Publication Data

US 2024/0161990 A1 May 16, 2024

(30) Foreign Application Priority Data

Mar. 12, 2021 (DE) ........................ 102021106091.5

(51) Int. Cl.
*H01H 50/04* (2006.01)
*H01H 50/10* (2006.01)

(52) U.S. Cl.
CPC ........ *H01H 50/048* (2013.01); *H01H 50/042* (2013.01); *H01H 50/045* (2013.01); *H01H 50/10* (2013.01)

(58) Field of Classification Search
None
See application file for complete search history.

(56) References Cited

U.S. PATENT DOCUMENTS 3,213,407 A * 10/1965 Thomas ................ H01R 31/00 439/43
3,790,915 A * 2/1974 Dugan .................. H01R 13/62 439/372
4,072,389 A * 2/1978 Hudimac, Jr. ....... H01H 50/047 411/548
5,995,377 A 11/1999 Tusler et al.
9,583,289 B2 2/2017 Larcher
9,653,891 B2 5/2017 V
9,748,713 B2 8/2017 Regnier et al.
10,066,820 B2 9/2018 Johnson
10,211,016 B2 2/2019 Haehnel
(Continued)

FOREIGN PATENT DOCUMENTS

CN 1351362 A 5/2002
CN 2909502 Y 6/2007
(Continued)

*Primary Examiner* — Bernard Rojas
(74) *Attorney, Agent, or Firm* — Slater Matsil, LLP

(57) ABSTRACT

Embodiments provide a housing assembly including a housing having a plug-in side and enclosing an electromechanical component, the housing configured for mounting on a carrier, wherein the housing has a first assembly guide configured for engaging in a first plug-in slot guide arranged on the carrier, and wherein the plug-in side of the housing is guidable into a plugged-in position on the carrier by this engagement.

22 Claims, 12 Drawing Sheets

(56) References Cited

U.S. PATENT DOCUMENTS

| | | | |
|---|---|---|---|
| 10,510,497 | B2 | 12/2019 | Larcher et al. |
| 11,678,996 | B2 | 6/2023 | Gamache et al. |
| 2002/0158729 | A1 | 10/2002 | Allada |
| 2003/0001700 | A1 | 1/2003 | Comtois |
| 2004/0041672 | A1 | 3/2004 | Chuang |
| 2013/0093544 | A1 | 4/2013 | Gassmann |
| 2013/0335176 | A1 | 12/2013 | Lee |
| 2015/0325399 | A1 | 11/2015 | Kinoshita |
| 2015/0380182 | A1 | 12/2015 | Kawamura |
| 2016/0050777 | A1 | 2/2016 | Kawamura |
| 2016/0079021 | A1 | 3/2016 | De Barros Albuquerque |
| 2016/0086755 | A1 | 3/2016 | Sakai |
| 2017/0069451 | A1 | 3/2017 | Birner |
| 2018/0053615 | A1 | 2/2018 | Nakahara |
| 2018/0298636 | A1 | 10/2018 | Minnich |
| 2018/0315570 | A1 | 11/2018 | Pan |
| 2020/0013573 | A1 | 1/2020 | Won et al. |
| 2020/0014162 | A1 | 1/2020 | Houry |
| 2020/0126736 | A1 | 4/2020 | Comtois |
| 2020/0244015 | A1 | 7/2020 | Henke |
| 2020/0260599 | A1 | 8/2020 | Harrer et al. |
| 2021/0043405 | A1 | 2/2021 | Zhang |

FOREIGN PATENT DOCUMENTS

| | | | | |
|---|---|---|---|---|
| CN | 204155847 U | | 2/2015 | |
| CN | 110073461 A | | 7/2019 | |
| CN | 111556675 A | | 8/2020 | |
| CN | 212570865 U | | 2/2021 | |
| DE | 4213436 A1 | | 10/1993 | |
| DE | 19638971 A1 | | 4/1998 | |
| DE | 29823870 U1 | | 12/1999 | |
| DE | 69604005 T2 | | 4/2000 | |
| DE | 10345198 A1 | | 5/2005 | |
| DE | 10346990 A1 | | 5/2005 | |
| DE | 102014215222 A1 | | 2/2016 | |
| DE | 102016011533 A1 | | 3/2018 | |
| DE | 202019101065 U1 | | 3/2019 | |
| DE | 102015121760 B4 | * | 5/2022 | ............. H01H 85/20 |
| DE | 102021124359 A1 | * | 3/2023 | ............. H01H 50/04 |
| EP | 0948016 A2 | | 10/1999 | |
| EP | 3404681 | | 11/2018 | |
| JP | S5117729 U | | 2/1976 | |
| JP | S5357243 U | | 5/1978 | |
| JP | S6071022 U | | 5/1985 | |
| JP | H0472444 U | | 6/1992 | |
| JP | H07312159 A | | 11/1995 | |
| JP | 2001351492 A | | 12/2001 | |
| JP | 2012502435 A | | 1/2012 | |
| JP | 2013540503 A | | 11/2013 | |
| JP | 6162546 B2 | | 7/2017 | |
| KR | 20210009002 A | | 1/2021 | |

* cited by examiner

HOUSING ASSEMBLY COMPRISING A HOUSING WITH PLUG-IN SIDE

CROSS-REFERENCE TO RELATED APPLICATIONS

This patent application is a national phase filing under section 371 of PCT/EP2022/051616, filed Jan. 25, 2022, which claims the priority of German patent application 102021106091.5, filed Mar. 12, 2021, each of which is incorporated herein by reference in its entirety.

TECHNICAL FIELD

The invention relates to a housing suitable for housing an electromechanical component, and to a housing assembly.

BACKGROUND

A large number of electrical and electromechanical applications, such as components of fuses or control devices, but especially contactors, require housings.

With regard to the housings, it is important that they themselves are robust, i.e. that the housed component is well protected. Furthermore, it is necessary that the housings are robustly installed in a device or in an assembled component.

These requirements apply not exclusively, but in particular, to the housings of contactors. The focus here is particularly on power contactors. Contactors usually represent electromechanical safety components in circuits in which high currents of up to 1000 A and, in particular, voltages in the range of around 1000 V and, for example, up to a maximum of 1500 V are present. Contactors are usually connected to a load current circuit by means of suitable contacts. Contactors can be remotely operated switches that can be switched on or off via a control circuit, which is a second current or signal line circuit on the contactor.

An important application of such contactors is usually found in the field of electromobility as a safety component for opening or disconnecting battery circuits. A common combination is, for example, that a contactor is used in combination with a fuse, which are positioned between a battery and an electric motor. The battery can be a lithium-ion battery, for example.

SUMMARY

According to a first embodiment of the invention, a housing assembly is described comprising a housing having a plug-in side and housing an electromechanical component and being configured for mounting to a carrier. Further according to this present embodiment, the housing comprises a first assembly guide configured to engage with a plug-in slot guide arranged on the carrier, wherein the plug-in side of the housing can be guided into a plugged-in position on the carrier by means of this engagement.

In this embodiment, the carrier can have a box-like shape, for example. A printed circuit board or circuit board can be arranged on the carrier. The printed circuit board or circuit board can be part of the carrier.

In this first embodiment of the invention, the housing positioned in plugged-in position is preferably placed on a slot on the carrier or on a circuit board on or in the carrier. For example, in this embodiment, there may be an electrical connection between a terminal in the slot and the electromechanical component.

The inventors of the invention have found that insertion of a housing into a carrier can be greatly facilitated if an assembly guide is arranged on the housing to engage the plug-in slot guide. For example, the housing can be brought into proximity of the slot or in proximity of the plugged-in position. In particular, it can be brought into a pre-insertion position, in which the assembly guide begins to engage the plug-in slot guide. Via the guiding formed in this way, the housing can now be easily brought into the plugged-in position along an insertion direction.

Furthermore, the interaction of assembly guide and plug-in slot guide can increase the stability of the housing assembly. In particular, the mechanical stability against forces acting perpendicular to the insertion direction can be improved.

If a corresponding combination of assembly guide and plug-in slot guide is implemented in a housing assembly, a positioning accuracy in plugged-in position or a positioning accuracy on a plug-in slot of up to 0.2 mm, in some cases even less, can be achieved. For example, such a positioning accuracy can be sufficient to insert a plug into a counterplug for electrical contacting for conventional housings with an internal volume of 100 to 1000 $cm^3$.

Thus, in accordance with this embodiment of the invention, a housing that is precise and easy to insert into a stable housing assembly can be provided.

In principle, the housing can be approximately cuboid. The shape can deviate from the perfect cuboid shape. For example, corners or edges may be rounded. Further, the housing may have portions, parts, or other components protruding from a cuboid core.

According to another preferred embodiment, the first assembly guide is shaped complementary to the first plug-in slot guide.

Complementary can be understood here as meaning that the shapes of the assembly guide and the plug-in slot guides fit together or into each other. For example, they can be shaped as positive or negative to each other. However, the positive or negative shape does not have to be complete. The respective shapes can also have interruptions or, for example, not be solid with regard to the material.

If the assembly guide and the plug-in slot guide are complementary in shape, the precision of the guide can be supported.

According to another preferred embodiment, the first assembly guide is arranged on a side that is lateral a side surface to the plug-in side of the housing.

This means that the assembly guide is preferably arranged on a side of the housing which is both not the plug-in side itself and not a side opposite to the plug-in side, which can be referred to as a base side of the housing.

The assembly guide preferably extends in the insertion direction.

Furthermore, the direction of the assembly guide is preferably oriented in the insertion direction and thus preferably perpendicular to the orientation of the plug-in side of the housing. This facilitates or enables insertion into the plugged-in position.

According to a further embodiment, the assembly guide may be rail-shaped. Preferably, the complementary plug-in slot guide can thus be rail-shaped, with the rail shape preferably fitting into the groove shape.

Furthermore, the assembly guide can, for example, have an insertion bevel at the end closest to the plug-in side, i.e. it can be beveled. This can facilitate the engagement of the assembly guide in the plug-in slot guide. Alternatively, the assembly guide can also be rounded, or its shape can facilitate engagement in the plug-in slot guide in a similar manner.

According to another preferred embodiment, the first assembly guide forms a protrusion. This can mean, for example, that the first assembly guide protrudes from the side surface on which it is arranged.

Thus, the shape of the complementary shaped plug-in slot guide is preferably an elongated indentation. This can facilitate engagement of the assembly guide with the plug-in slot guide.

According to a further preferred embodiment, the housing comprises a second assembly guide on a further side surface lateral to the plug-in side of the housing. This second assembly guide is also provided for and suitable for engaging in a second plug-in slot guide. In this case, the second plug-in slot guide is preferably also arranged on the carrier.

A second assembly guide arranged on a different side surface than the first assembly guide has the advantage that the housing can be fixed on two side surfaces. This can increase precision when inserting into the slot. The plugged-in position itself can also be more precisely defined.

Furthermore, the mechanical stability, especially in directions perpendicular to the insertion direction, can also be increased by the second assembly guide and plug-in slot guide.

This advantage is particularly pronounced when the second assembly guide is located on a first side surface of the housing opposite the first assembly guides.

According to a further and preferred embodiment, an assembly guide is provided or arranged on each side surface of the housing lying laterally to the plug-in side. This is suitable for engagement in a suitable plug-in slot guide, which is preferably arranged on the carrier.

Thus, a first, a second, a third and a fourth assembly guide can each be arranged on the housing on a side surface lying laterally to the plug-in side, assuming a cuboid housing. If the housing has several side surfaces lying laterally to the plug-in side of the housing, further assembly guides can be arranged on the housing analogously. Preferably, a corresponding number of plug-in slot guides is provided on the carrier for each assembly guide.

With four assembly guides and four plug-in slot guides, the stability and precision can be further increased compared to the case where only one or two plug-in slot guides are provided.

According to a further preferred embodiment, two openings for passing electrical contacts or contact elements can be arranged on a side surface of the housing. In this case, an assembly guide, i.e. one of the first assembly guides or a further assembly guide, can preferably be arranged between the openings, which is provided and designed to form an electrical shielding between the contact elements in the area between the openings.

The contact elements may be the load current circuit contacts of a contactor.

Consequently, one of the assembly guides can serve as a shield, which is arranged between the electrical contacts. This can, for example, provide shielding when connecting or electrically contacting these contacts if the terminals are already set under voltage during contacting.

Such shielding can also shield stripped contacts or terminals from each other during operation, e.g. to prevent flashovers.

The lines which are attached to the corresponding contacts in a contactor, for example, can preferably be characterized in such a way that voltages of over 1000 volts and currents of over 500 amperes are applied to them. This means that power of between 50 kilowatts and over 500 kilowatts can be applied to them.

According to another particularly preferred embodiment, an electrical plug may be disposed in the plug-in side of the housing. Further, the electrical plug contacts a counterplug on or in the carrier.

Preferably, this allows the housing to be guided into the plugged-in position while at the same time the plug electrically engages the counterplug to establish electrical contact.

The plug and the counterplug can preferably be part of a control circuit of a contactor or another electromechanical component which is enclosed in the housing. Thus, the electromechanical component is preferably electrically connected to the plug, so that during installation, the electromechanical component becomes electrically contacted.

According to a further preferred embodiment, the housing has the base side opposite the plug-in side. In this base side, attachment points can be arranged, for example, on parts projecting from the base side, the attachment points being intended and suitable for being attached to the carrier by means of screwing.

The screwing can be carried out, for example, on a retaining bolt located in the carrier.

The screwing allows a stable attachment of the housing to the carrier in all directions.

According to a further preferred embodiment, at least one external fine guiding element may be arranged at the plug-in side or in the plug-in side. Preferably, such an external fine guiding element may be arranged near or directly on a plug as described above. The external fine guiding element is designed to engage with a first fine positioning element arranged on the carrier. Preferably, the fine positioning element is arranged at the connector.

Accordingly, the plug-in side of the housing can be positioned even more precisely on the carrier in the plugged-in position by means of this last-described engagement of the external fine guiding element with the fine positioning element.

For some electrical contacts, the precision achieved with assembly guide and plug-in slot guide alone may, in some cases, not be sufficient. In such cases, an external fine guiding element can be provided which precisely guides the plug-in side into the plugged-in position during insertion, for example during the last millimeters of insertion in the insertion direction.

Here, guiding accuracies of significantly less than 0.2 mm, for example 0.1 mm or smaller, can be achieved.

According to a further preferred embodiment, a method for mounting the housing assembly is provided. Here, the housing is first brought into a pre-insertion position in which the assembly guide begins to engage in the plug-in slot guide. This insertion into the pre-insertion position can be performed, for example, manually or by a corresponding insertion machine. The housing can then be pushed into the plugged-in position along an insertion direction under the guidance of the interlocking assembly guide and the plug-in slot guide.

This method of assembly offers the advantages explained concerning the housing.

Preferably, in this case, the procedure for assembling a housing can be carried out in such a way that the insertion direction is oriented in the direction of gravity.

Preferably, the housing is oriented with the plug-in side facing downwards, i.e. in the direction of gravity. It is also inserted in this direction in an insertion process. This means that the direction of gravity is preferably the insertion direction.

This has the advantage that the housing is held in position by gravity before possible screwing is provided.

Furthermore, forces that often act perpendicular to the direction of gravity in mobile applications can be better absorbed by the assembly guides and the plug-in slot guides.

In a further embodiment, a housing for accommodating an electromechanical component comprising a first housing component and a second housing component is described. Accommodation of an electromechanical component may be housing of the electromechanical component, for example it may be an enclosure of the electromechanical component. In the first embodiment, the second housing component comprises a first guide groove. Also, the first housing component comprises a first complementary element. In this embodiment, the first complementary element and the first guide groove are configured such that a connection of the housing components to a housing can be achieved, or is achieved, by sliding one within the other along a guide direction.

Particularly preferably, the housing is a contactor housing, i.e. a housing which is intended and suitable for housing a contactor as an electromechanical component.

These features of the housing described according to the present embodiment may be provided on the housing as an alternative or in addition to the features previously described in connection with the housing assembly.

According to the present embodiment, the housing may be assembled, but need not necessarily be assembled. The first and second housing components that together form the housing may be unassembled, but are at least suitable to be assembled.

The housing may comprise more than two housing components. Preferably, it mainly comprises the first housing component and the second housing component.

The first and second housing components may be first and second housing halves, respectively.

Preferably, the first complementary element fits into the first guide groove. For this, in principle, the first guide groove can have any shape. For example, the guide groove can be notched into the material that forms a side surface of the second housing component. Furthermore, the shape may have undercuts. That is for example, the shape may be wedge-shaped, trapezoidal, T-shaped or also L-shaped with respect to its cross-section. This shape is preferably formed or buried in the material that forms a side surface of the second housing component.

The complementary element has a shape that matches the guide groove. For example, the complementary element can have a rail-like shape. This means that the complementary element can be guided in the guide groove like a rail. However, this does not necessarily mean that the complementary element must be longer in the guide direction than it is wide in the direction perpendicular to the guide direction. It can also be wider than long, for example.

In principle, the guide groove and/or the complementary element can have a stop which limits the positions of the housing components relative to each other. The stop can be ensured, for example, by the housing components abutting against each other in a certain position, thereby preventing further sliding together in the guide direction. The stop may also be part of the guide groove. For example, the stop can be an end of the guide groove beyond which the complementary element cannot be guided in the guide direction.

Further, the guide groove or complementary element, or both, may include an engaging or clamping element that can provide some stability in the guide direction.

Preferably, however, securing or stabilization in the guide direction is achieved by the measures described below.

According to this first embodiment, a particularly stable connection of the two housing components to each other can be achieved. By firmly sliding the first complementary element into the first guide groove, a significantly more stable connection can be achieved than when a two-component housing is held together solely via unstable latching, for example.

In particular, the housing in the assembled state can be particularly resistant to forces acting perpendicular to the guide direction due to the guide groove and the complementary element. Furthermore, the housing can thus also be particularly resistant to torsion or twisting about an axis parallel to the guide direction.

In addition, this housing configuration can enable simple and straightforward assembly of the housing components or housing of the electromechanical component. According to the embodiment described above, the two housing components only need to be pushed together around an electromechanical component which is to be protected.

This encapsulation can thus be simpler than in the case of multi-part housings in which the housing components are cast together with a component to be encapsulated using a resin or other filler material. In addition, a much lighter composite of housing and component to be housed can be achieved in this way than could be achieved in a case of cast-encapsulation.

Thus, a synergistic effect can also be achieved with the embodiments described for the housing assembly, since both a stable housing and a stable shoring in a housing assembly can thus be facilitated or ensured.

In principle, however, these individual aspects mentioned above can also be implemented separately from one another, since they bring at least a gradual advantage even for housings that do not have the other feature in each case.

According to a preferred embodiment, the connection of the housing components is force-locking perpendicular to the guide direction. Even more preferably, the connection is force-locking in all directions perpendicular to the guide direction.

This can mean, for example, that the two housing components can only be assembled or pushed together or pulled apart along the guide direction, at least as long as no other components are arranged on the housing that prevent this. In at least one or preferably in all directions perpendicular to the guide direction, moving the housing component apart can be restricted by the complementary element engaging in the guide groove.

This allows the housing to be particularly stable in all directions perpendicular to the guide direction. This also applies to twisting about an axis parallel to the guide direction.

According to a further preferred embodiment, the force-locking connection may be supported by or achieved by the shape of the guide groove and the shape of the complementary element that is complementary to the shape of the guide groove.

Here, a complementary shape can be understood to mean that the shapes fit into each other in a substantially form fitting manner. However, the shape of the guide groove and the shape of the complementary element do not necessarily have to behave like positive and negative, but they can. For example, the complementary element could have interruptions in its shape in the guide direction.

Alternatively or additionally, the complementary element could be wing-shaped, with the wings engaging undercuts.

Alternatively, however, also the guide groove can be formed only in parts along the guide direction, for example as a kind of brackets into which the complementary element engages.

According to a further embodiment, a second guide groove and a second complementary element may also be included in the housing or the housing may comprise the same. In this case, the second complementary element is also configured to and suitable for being pushed into the second guide groove or to be interlocked in a manner equivalent to the first guide groove and the first complementary element.

Preferably, in this embodiment the two complementary elements are each arranged on the first housing component and the two guide grooves are arranged on the second housing component.

Preferably, the second complementary element fits into the second guide groove. Preferably, the second guide groove and the second complementary element are shaped and arranged on the housing in such a way that, when the two housing halves are pushed together with the aid of the first guide groove and the first complementary element, they can be pushed together with the latter at the same time, whereby the second complementary element can engage in the second guide groove.

Preferably, the second guide groove is also arranged on the first housing component in the same way as the first guide groove. Accordingly, the second complementary element is preferably also arranged on the first housing component.

If two guide grooves are formed with two complementary elements, these can be arranged symmetrically with respect to a plane of symmetry or an axis of symmetry of the housing, for example.

With two guide grooves and two complementary elements, a similarly stable connection of the two housing components can be achieved, particularly against torsion, as with a very wide single guide groove and a single complementary element. Yet the amount of material required to form two elements can be lower under certain conditions.

According to a further preferred embodiment, the housing comprises or has arranged thereon a securing means, said securing means providing a fixed connection of the first and second housing components in the guide direction.

Here too, the housing can be regarded as a set of individual components which together form the housing, i.e. the housing comprises the first housing component, the second housing component, and elements which serve as a securing means. These do not have to be assembled.

The aforementioned preferred embodiment has the advantage that, at the end of the assembly process, the housing components are firmly connected to one another, for example by force-locking, also in the guide direction.

This means that the securing means synergistically supplements the connection of the housing components by means of the guide groove and complementary element.

According to a preferred embodiment, the securing means may be realized, for example, in the form of two or more securing elements, or the securing means may comprise two or more securing elements.

For example, the securing means may consist of two or more securing elements.

For example, these two or more securing elements can be elongated tenons which are inserted, for example, into overlapping side surfaces of the two housing components in a direction perpendicular to the guide direction. For example, they may be rivets, pins, or also screwing or nails. These securing elements are preferably metallic. For example, they can contain the materials steel, bronze, or aluminum. Likewise, the securing elements may also contain alloys of these materials, in particular those with a similar mechanical stability to that of steel. The securing elements may also comprise materials of the housing, for example, they may comprise the polymer of the housing. The securing elements may also consist of these materials.

According to a preferred embodiment, the securing elements comprise at least one hollow sleeve disposed in aligned holes in the first and second housing components.

In particular, the securing elements may be formed as one or more hollow sleeves, wherein the first housing component has holes aligned with corresponding holes in the second housing component and the one or more hollow sleeves are arranged in these aligned holes.

Preferably, the hollow sleeves are made of metal and may have a round or an oval cross-section. They can also be hollow rivets, for example.

The hole-shaped openings on the housing formed in this way can serve as attachment points to which the housing is externally fastened.

For example, the holes or the attachment points can be arranged on a base side of the housing. Preferably in this case, the holes are arranged in an overlapping area of the first and second housing components, which may also be referred to as an overlap area. Even more preferably, they are arranged on wing-like components of the first and second housing components that protrude from the main body of the housing.

Screwing, for example, can be carried out at the attachment points formed in this way. For example, screws or grub screws can be passed through them, which either fasten the housing on a slot directly with the base side resting on a fastening element or with the plug-in side, which is usually opposite the base side.

Thus, a synergistic effect can be achieved in which the securing elements serve both to secure, i.e. to firmly connect the first and second housing components in the guide direction, and as attachment points for external fastening of the housing.

According to a further preferred embodiment, the housing comprises at least one latching. In this embodiment, the first housing component and the second housing component are preferably assembled. By means of the latching, the first housing component and the second housing component are latched together.

In particular, the second housing component has a latching element comprising an elastic or bendable part and a hook-shaped part. This hook-shaped part can, for example, engage in an opening in the first housing component.

Furthermore, several similar or identically designed latchings can be provided or arranged on the housing in an analogous manner.

The latching can be arranged on any parts of the housing. In other words, the parts of the latching that engage with each other can be arranged on the respective housing components in such a way that they can engage with each other.

Latching can have several advantages in this regard. Firstly, the latching can serve as additional stabilization or fastening of the two housing components to each other in the guide direction in addition to or instead of the securing means.

For example, the latching can also represent a depth stop in the guide direction by fixing the first housing component to the second housing component by latching in a certain position relative to each other. For example, in such a position the holes can be aligned with each other, in which case the securing means, for example, can be inserted into the holes.

Furthermore, such latching can reduce the risk for the housing components to slip with respect to each other during or after installation or they can prevent them from slipping.

According to a preferred embodiment, the at least one latching or the plurality of latchings is disposed on a side of the housing opposite the guide groove.

In particular, the latching or the latchings may preferably be arranged on a side of the housing opposite to a side of the housing in which the first guide groove is arranged.

By placing the latching and the guide groove into which the complementary element engages opposite each other, a particularly stable connection of the housing halves to each other can be achieved. The opposite arrangement prevents the housing components from gapping open on the plug-in side under mechanical load.

According to another preferred embodiment, the housing comprises openings arranged on the housing so as to be suitable for guiding electrical contacts in the guide direction from the inside of the housing to the outside.

These electrical contacts can be, for example, the load current circuit contacts of a contactor.

For example, the openings may be located on a side surface of the housing, which is oriented perpendicular to the guide direction. For example, the contactor or another electromechanical component could then be placed or set in the second housing component and, in the guide direction, the first housing component can be pushed onto the second housing component around the electromechanical element to be protected. In this case, load current circuit contacts can then pass through the openings to the outside. Contacts can then be easily made at these without the need for an additional process step of guiding load current circuit cables to the outside.

These may be the openings between which an assembly guide may be arranged as a shield, as described above.

BRIEF DESCRIPTION OF THE DRAWINGS

The invention is described in more detail below with reference to exemplary embodiments. These exemplary embodiments are depicted in the following figures, which are not to scale. Lengths as well as relative and absolute dimensions can thus not be taken from the figures. Nor is the invention limited to the following embodiments.

DETAILED DESCRIPTION OF ILLUSTRATIVE EMBODIMENTS

Figure 1:
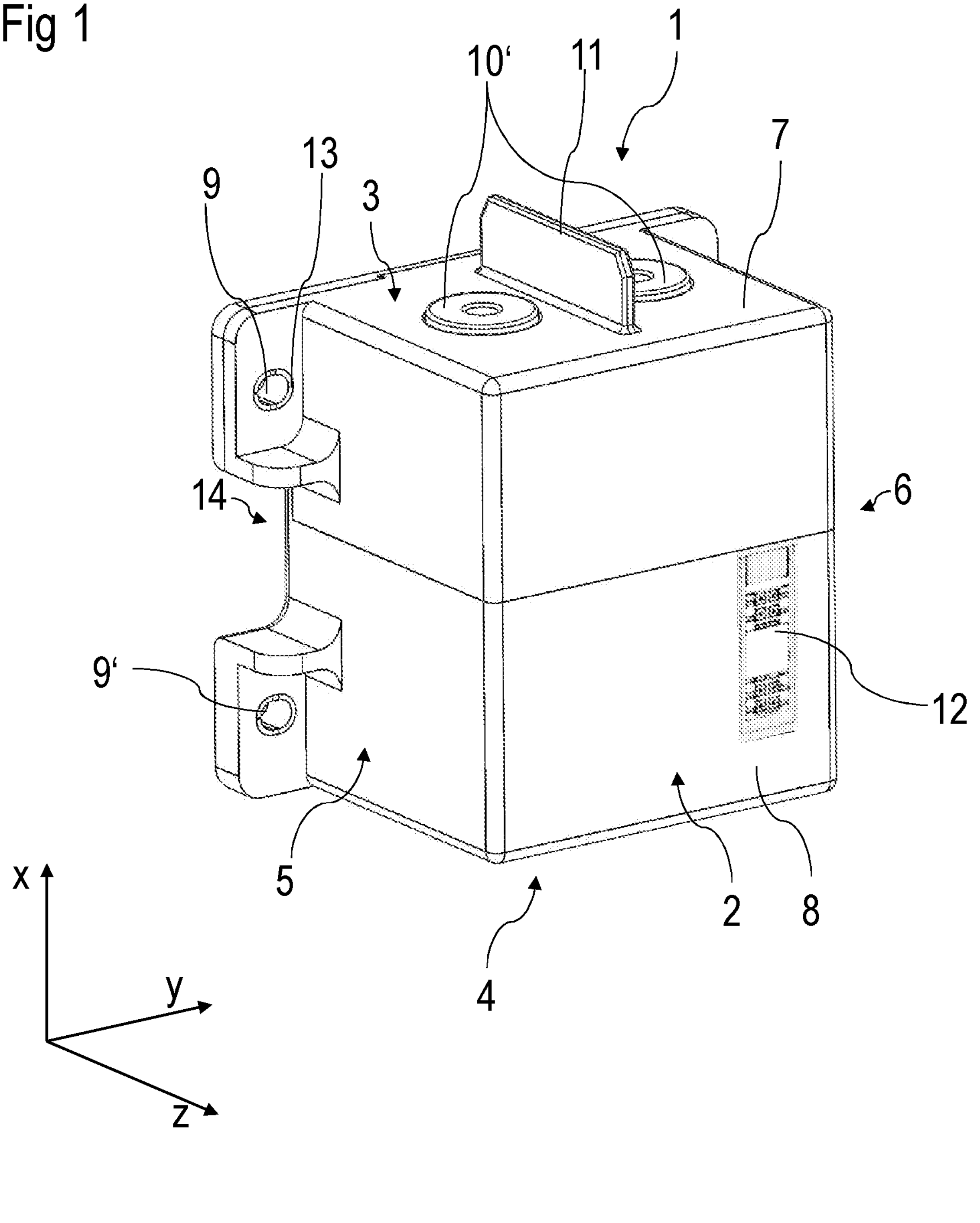
FIG. 1 shows a perspective view of a first exemplary embodiment of the housing in the assembled state housing an electromechanical component.

FIG. 1 shows a schematic perspective view of a first exemplary embodiment of a housing 1 according to the invention.

The housing 1 can be characterized by an internal orthogonal coordinate system spanned by x, y, z. The housing 1 is largely cuboidal with rounded corners and edges.

The housing 1 has a plug-in side 2 which is oriented parallel to the x-y plane of the internal coordinate system.

The housing is intended and suitable to be placed into a housing assembly with the plug-in side first. The surface normal of the plug-in side, which is parallel to the z-direction, can thus be defined as the insertion direction.

Opposite the plug-in side 2 is the base side 14. The other side surfaces are numbered as first side surface 3, as second side surface 4, which is opposite the first side surface 3, as third side surface 5 and as fourth side surface 6.

The housing 1 comprises a first housing component 7 and a second housing component 8 which enclose an electromechanical component, such as a contactor. However, it is noted here that the invention is not limited by the fact that an electromechanical component is enclosed within the housing. Furthermore, the two housing components 7 and 8, which may be regarded here as housing halves, need not be assembled. They are suited to be assembled.

The plug-in side 2 of the housing 1 has a plug 12 located in or at the plug-in side 2 which is suitable and intended to be plugged into a counterplug, as explained below.

Furthermore, the second housing component 8 has a first guide groove 17, which is shown in more detail below for FIGS. 2 and 3. The first guide grove 17 engages the first complementary element 16, which is shown in more detail together with the guide groove 17 below.

The housing 1 can be assembled from the first housing component 7 and the second housing component 8 by pushing the two housing components 7 and 8 together in the guide direction via the guide groove 17 and the complementary element 16 that engages in the guide groove 17. The direction of pushing together is here the guide direction and this is oriented parallel to the x-axis. The guide direction is oriented in the −x direction (negative x direction).

The interlocking of the first guide groove 17 and the first complementary element 16 produces a force-locking connection of the housing 1 in all directions perpendicular to the guide direction.

Furthermore, the housing has openings on the first side surface 3, which in this case are openings with load current circuit contacts 10', the load current circuit contacts being guided through the openings. The load current circuit contacts can be the load current circuit contacts of a contactor. A shield 11 is arranged between the openings with the load current circuit contacts 10'. This shield 11 represents a means for electrical shielding of the contacts from each other. The load current circuit contacts can here simply push through the openings in the first housing component 7 when the housing components 7 and 8 are assembled, since the openings are oriented perpendicular to the guide direction, i.e. in the y-z plane.

Furthermore, the housing has a total of four attachment points, namely two first attachment points 9 and two second attachment points 9' in each case. All attachment points 9 and 9' are arranged in areas projecting from the cuboid housing, and the projecting areas are preferably flat within the x-y plane. The attachment points 9 and 9' are suitable and intended for the housing to be attached to an external element, such as a carrier, by screwing, as shown in more detail below.

The first attachment points 9 are formed by inserting a metal hollow sleeve 13 into aligned holes in the first housing component 7 and the second housing component 8, which are part of an overlap area of the first housing component 7 and the second housing component 8 explained in more detail below. The hollow sleeves are oval in the present exemplary embodiment, but may also be circular.

The second attachment points 9' can also have corresponding hollow sleeves.

The first attachment points 9 with the hollow sleeves 13 serve as a securing means. In particular, the hollow sleeves 13 can be understood as a securing element. The securing created in this way prevents the first housing component 7 and the second housing component 8 from being displaced against each other in the guide direction (i.e. parallel to the x-direction).

Thus, the first guide groove 17 the first complementary element 16 and the securing ensure a force-locking connection of the two housing components in all three spatial directions.

In principle, the housings 1 shown here and below can be manufactured by any process.

Preferably, however, an injection molding process is used. Preferably, the injection molding process a starting compound that includes a polymer component and glass wool is used. The polymer component can be, for example, polyamide, but is preferably polybutylene terephthalate (PPT). Furthermore, glass wool can be used in the starting material in a proportion by weight of 20 wt. % to 40 wt. %, and preferably 30 wt. %, in order to provide a housing 1 that is largely temperature-resistant.

The dimensions of the housing 1 can basically be varied as required depending on the electromechanical component to be housed.

Preferably and suitable for a variety of applications, the plug-in side 2 has an area of 25 to 100 $cm^2$. A depth of the housing in the direction perpendicular to the plug-in side 2 can be 4 to 10 cm. In general, however, the features described herein are also applicable to housings that deviate from these dimensions.

For example, for a plug-in side with the dimensions mentioned above, a plug 12 can have an area of 10 to 600 $mm^2$.

Figure 2:
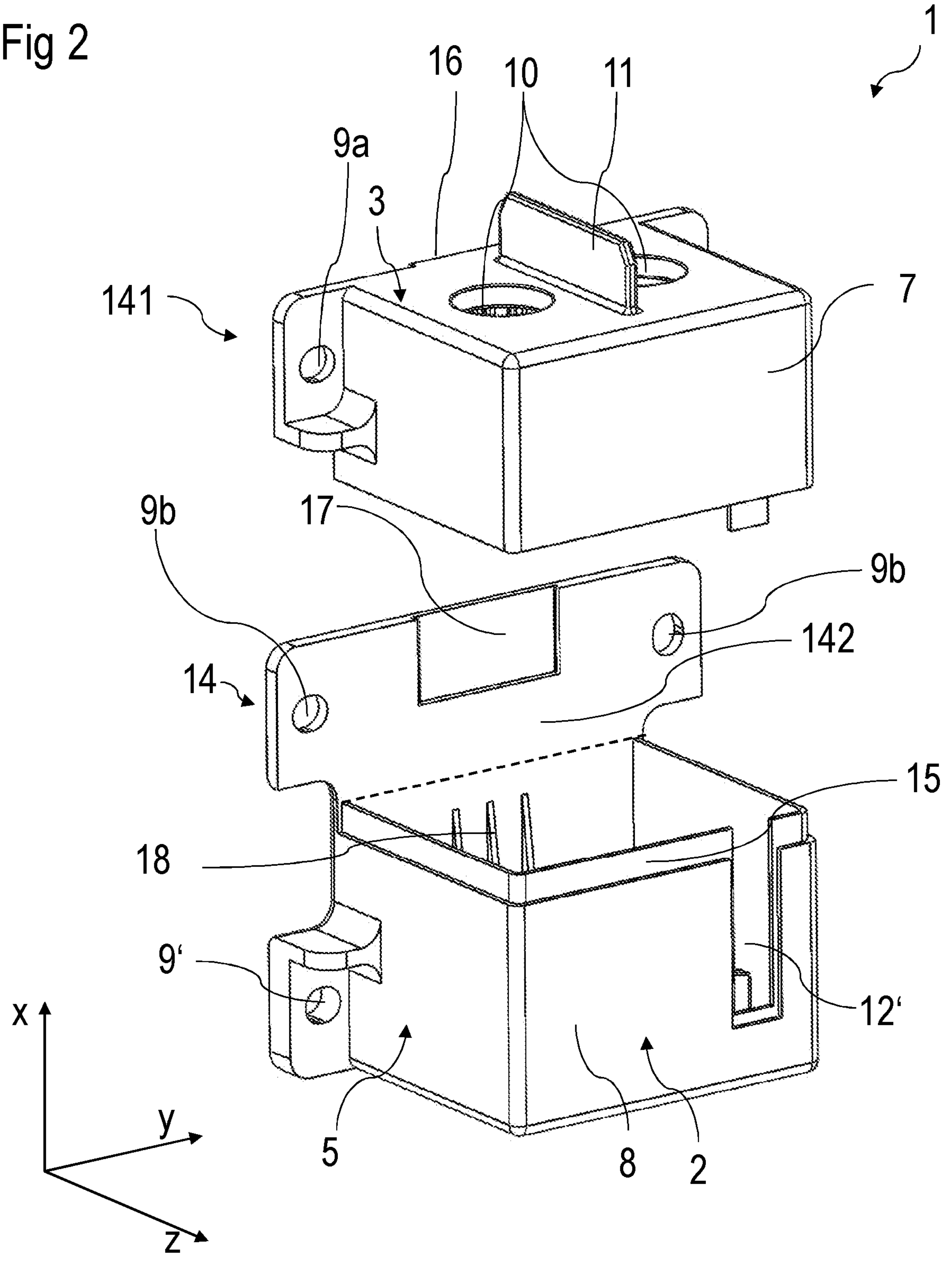
FIG. 2 shows a first perspective view of the first exemplary embodiment of the housing with the housing components being separated from each other along the insertion direction.

FIG. 2 shows the first exemplary embodiment of the housing 1 in perspective view, with the housing components shown spaced apart or separated from one another along the opposite guide direction. That is, the first housing component 7 is shown displaced from the second housing component 8 in the x-direction. This makes it easier to show the guide groove 17 in the overlap area 142. All other components, unless otherwise indicated, correspond to those shown in FIG. 1.

There is no electromechanical component in the housing 1 in this illustration. The inside of the housing is empty and no load current circuit contacts are shown in the holes 10. Furthermore, instead of a plug, the housing 1 has a free space 12' for a plug, into which a plug can be inserted. Alternatively, wiring could be routed through the free space 12'.

FIG. 2 clearly shows that the base side 14 of the housing 1 in the assembled state is formed by an overlapping part of the first housing component 7 and the second housing component 8. These overlapping parts are referred to as the overlap area 141 of the first housing component 7 and the overlap area 142 of the second housing component 8, respectively.

In the present exemplary embodiment, the entire side of the first housing component 7 facing away from the viewer here is the overlap area 141 of the first housing component 7.

For the second housing component 8, the overlap area 142 is marked by the dashed line. In the assembled state, the overlap area 141 and the overlap area 142 overlap when viewed in the z-direction as the viewing direction.

Furthermore, in the overlap area 142, the first guide groove 17 is formed, which is provided and suitable for the first complementary element 16 to engage in. In other words, the first complementary element 16 can be pushed into the first guide groove 17 along the guide direction (here x-direction).

The extent of the first guide groove 17 and the first complementary element 16 in the guide direction (−x-direction) can be defined as the length of the first complementary element 16 and the first guide groove 17, respectively. The width of these components is defined perpendicular to the x-direction, i.e. parallel to the y-direction, in each case.

The end of the guide groove 17 in the guide direction (−x-direction), starting from the nearest edge of the housing 1, can be understood as a depth stop up to which the housing components 7 and 8 are pushed into one another and thus remain in a fixed position relative to one another after this pushing together.

Furthermore, the second housing component 8 has a plug-in area 15, which is a lowered area of the second housing component 8 onto which a corresponding area of the first housing component is plugged to provide additional stability.

Furthermore, the second housing component 8 has holes 9*b* which, when assembled, align with holes 9*a* in the first housing component 7. A hollow sleeve 13 can then be inserted into these holes as shown in FIG. 1.

Furthermore, the housing 1 of FIG. 2 can have structural components 18 on the inside, which, for example here as lamellar ribs, reinforce the mechanical stability of the housing 1.

Figure 3:
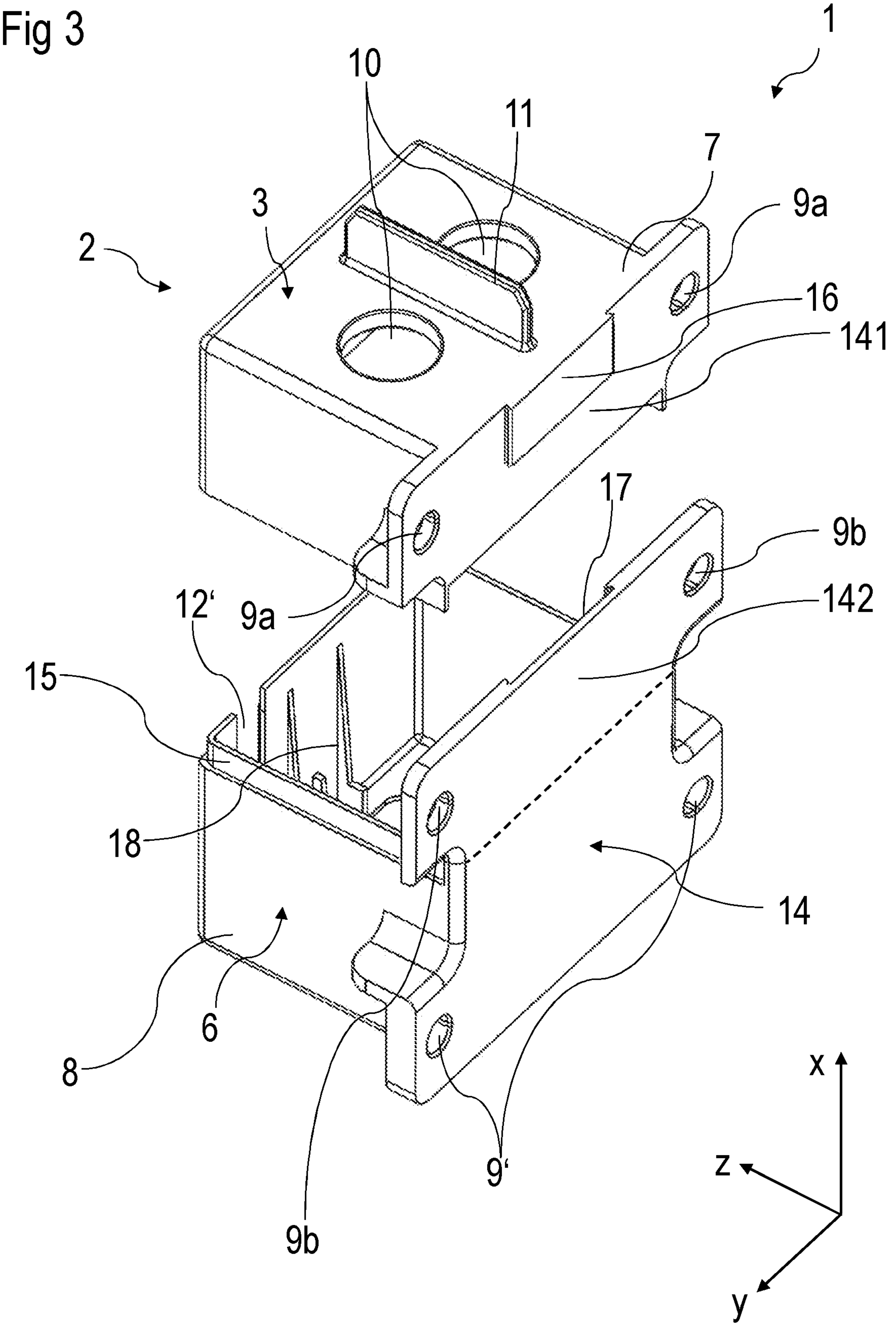
FIG. 3 shows a second perspective view of the first exemplary embodiment of the housing with the housing components being separated from each other along the insertion direction.

FIG. 3 shows another view of the first exemplary embodiment of the housing 1, looking at the base side 14.

All components of the housing 1 correspond to those shown in FIG. 2. In particular, however, the shape of the first guide groove 17 can be reproduced here. This has undercuts in which the corresponding complementary element 16 engages. In the present exemplary embodiment, the complementary element 16 and the guide groove 17 behave as positive and negative.

The complementary element 16 shown here is larger in its width (y-direction) than in the guide direction (−x-direction). For example, a width of the complementary element 16 can correspond to between 20% and 80% of the width of the base side.

In the case of a single complementary element 16 and a single guide groove 17, a length can be basically arbitrary. In the form shown, it corresponds to between 10 and 90% of the corresponding extension of the base side in the same direction. In principle, the longer the guide groove 17 is, the more stable the connection can be, in particular with respect to torsion.

Figure 4:
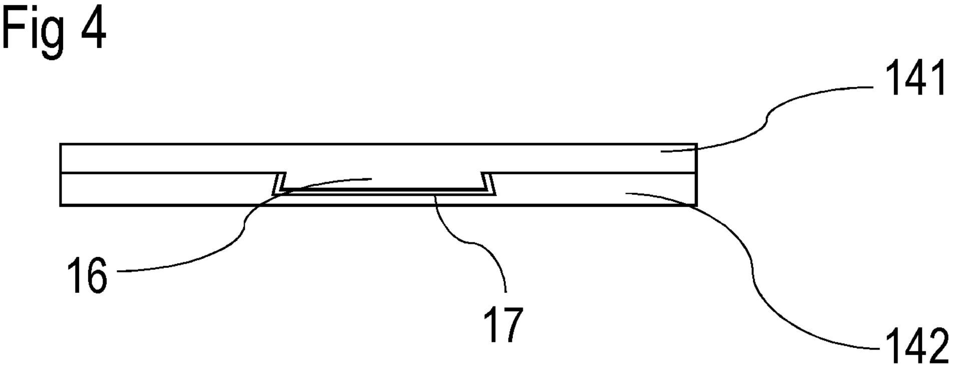
FIG. 4 shows a schematic cross-section of a first complementary element and guide groove.
Figure 5:
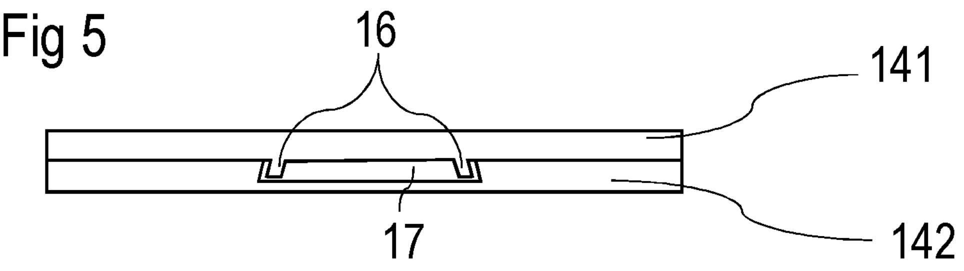
FIG. 5 shows a second exemplary embodiment of the complementary element and guide groove in schematic cross-section.
Figure 6:
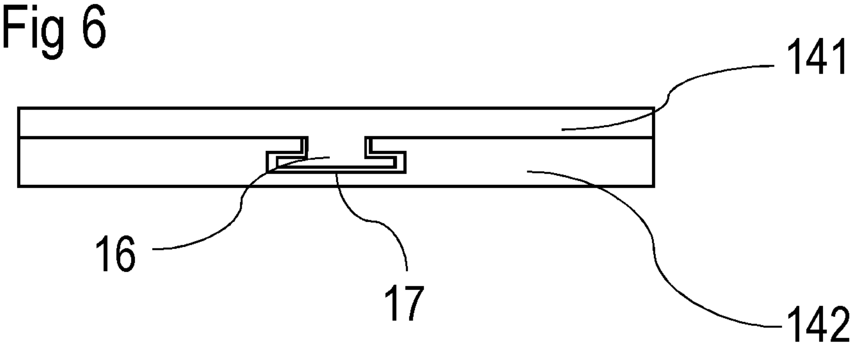
FIG. 6 shows a third exemplary embodiment of the complementary element and guide groove in schematic cross-section.

The shape of the guide groove 17 and the complementary element 16 associated therewith can be manifold and is not further restricted as long as it allows the first and second housing components to be pushed or guided into one another as described above. FIGS. 4 to 6 show various exemplary embodiments of the complementary element 16 and the guide groove 17 in schematic cross-sections of the overlap area 141 of the first housing component 7 and the overlap area 142 of the second housing component 8.

FIG. 4 shows a first guide groove 17 corresponding to the guide groove of the first exemplary embodiment. The guide groove 17 has a trapezoidal shape and is recessed in the overlap area 142 of the second housing component 8, with the shorter of the parallel sides of the trapezoid being oriented in the direction of the contact surface of the overlap areas 141 and 142. Due to the trapezoidal shape, it has undercuts. The complementary element 16 is formed on the overlap area 141 of the first housing component 7 and engages in the undercuts with its shape that is complementary to the shape of the guide groove 17, thus preventing the housing components from falling apart or being taken apart in all directions perpendicular to the guide direction, that is, in all directions within the representation plane of the cross section. The guide groove 17 and the complementary element 16 thus establish a force-locking connection in all directions perpendicular to the guide direction.

The first complementary element 16 does not necessarily have to be completely or continuously formed along the entire length of the first guide groove 17 in the guide direction. For example, the first complementary element 16 can have interruptions in the guide direction. Preferably, however, both the first complementary element 16 and the first guide groove 17 are formed continuously in the guide direction, so that uniform guiding can be facilitated when the housing components are pushed together.

The first guide groove 17 does not necessarily have to be continuous either. It could also be formed with increased thickness in partial areas of the overlap area 142 of the second housing component 8 and not in other, flatter areas. However, a continuously formed first guide groove 17 is also preferable here for the previously mentioned reasons.

Also, as shown in FIG. 5, the first complementary element 16 does not necessarily have to replicate the complete shape of the first guide groove 17 such as positive to negative in order to be considered complementary with respect to its shape. Accordingly, in the exemplary embodiment shown in FIG. 5, the first complementary element 16 is formed as two wings, each of which engages the trapezoidal undercut of the first guide groove 16.

Thus, the amount of material required for the first complementary element 16 can be reduced.

FIG. 6 shows a further exemplary embodiment of a first guide groove 17 and a first complementary element 16, in which, unlike to the previous examples, there are no oblique undercuts here, but instead the first guide groove 17 and the first complementary element 16 have a T-shape and thus have undercuts parallel to the base side 14 of the housing 1.

Figure 7:
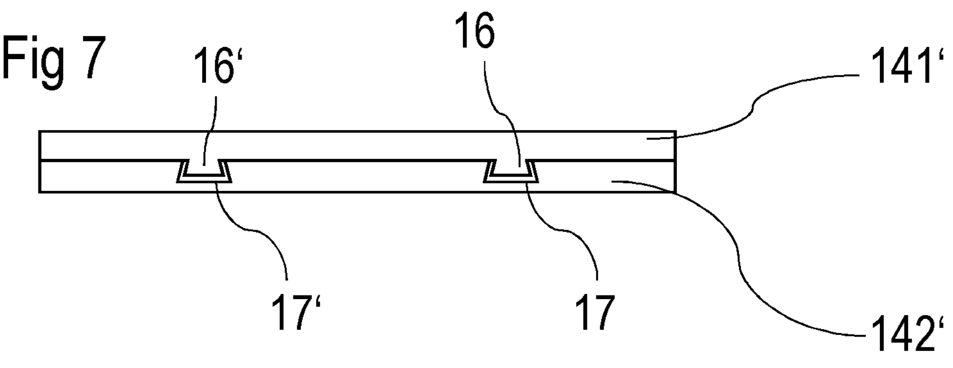
FIG. 7 shows a first exemplary embodiment of two complementary elements and two guide grooves in schematic cross-section.

The cross-section in FIG. 7 shows an exemplary embodiment in which both a first guide groove 17 and a second guide groove 17' are provided. The complementary first complementary element 16 and the second complementary element 16' engage in these grooves.

These structures can, for example, be arranged symmetrically to a symmetry plane of the housing. With these, stability against torsion can be achieved, which would otherwise have to be achieved with a single very wide complementary element.

Preferably, in the case of two guide grooves and complementary elements, their respective extent in the guide direction can be greater than their width.

Analogously, other complementary elements and guide grooves can also be provided in principle.

Figure 8:
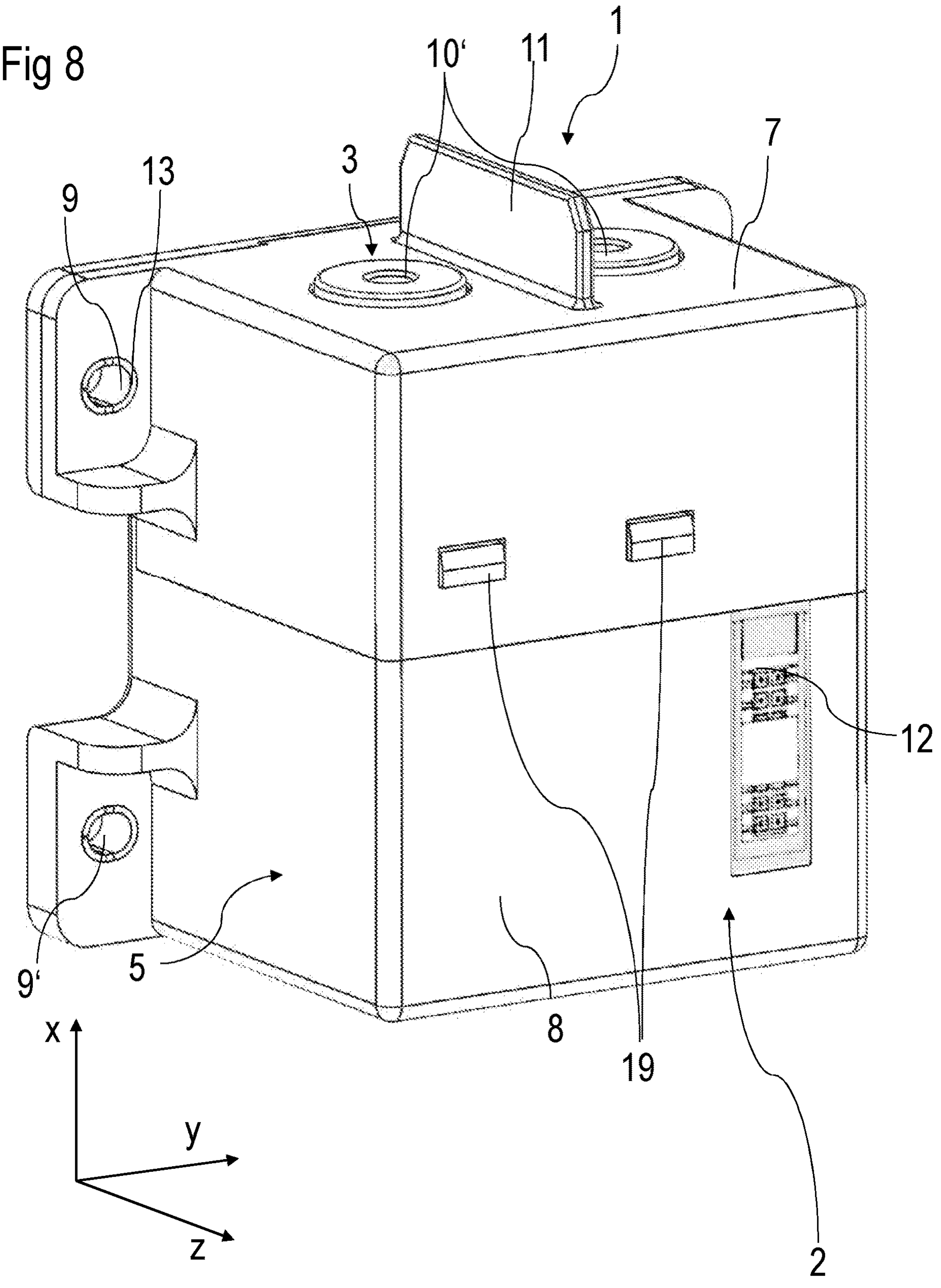
FIG. 8 shows a perspective view of a second exemplary embodiment of the housing in the assembled state, enclosing an electromechanical component.

FIG. 8 shows a perspective view of a second exemplary embodiment of the present invention or housing 1.

All components as described for FIG. 1 are provided here. In addition, the housing has a latching 19 in the plug-in side 2.

This latching 19 comprises openings which are located here in the first housing component 7. Hook-shaped elements of a latching element engage in these openings, which also comprise resilient parts and flexible parts. These are part of the second housing component 8 or are attached to it.

The hook-shaped parts engage in the openings and allow an additional mechanically stable connection of the first housing component 7 and the second housing component 8. In particular, it is thus possible to prevent the two housing components from gapping open by the latching 19 forming a connection between the housing components, which is arranged opposite the connection formed by first guide groove 17 and first complementary element 16.

Figure 9:
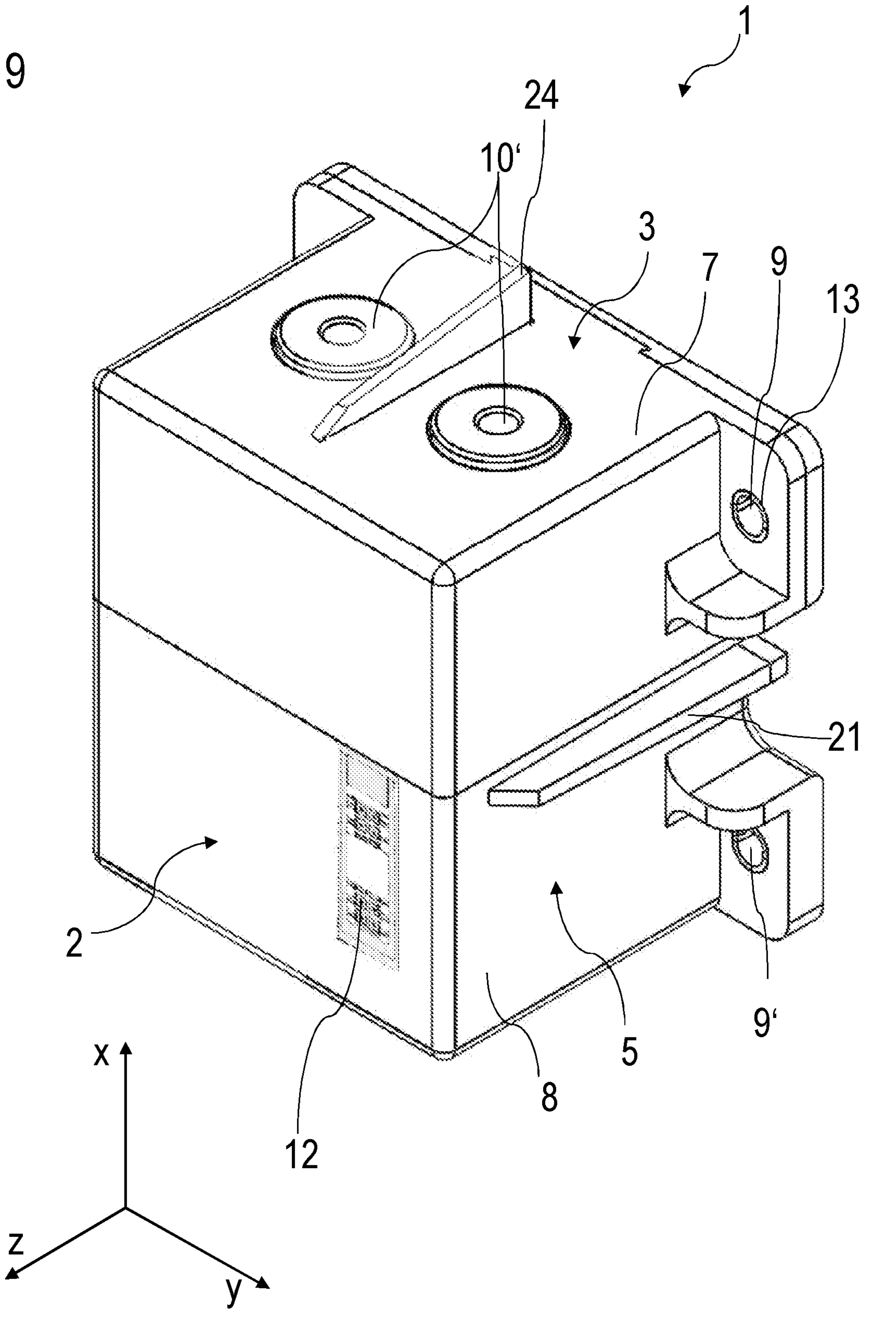
FIG. 9 shows a perspective view of a third exemplary embodiment of the housing enclosing an electromechanical component.

FIG. 9 shows a perspective view of a third exemplary embodiment of the housing 1.

The third exemplary embodiment of the housing 1 corresponds to the previous exemplary embodiments except for the following features.

The housing 1 of the present third exemplary embodiment has a first assembly guide 21 on the third side surface 5. Furthermore, a fourth assembly guide 24 is arranged on the first side surface 3 of the housing. The further assembly guides (second assembly guide 22 and third assembly guide 23) are formed in the present exemplary embodiment, but cannot be seen due to the perspective view.

That is, all four side surfaces 3, 4, 5, and 6 of the housing 1 have assembly guides. The assembly guides are elongated in the z-direction and are accordingly oriented in this direction. They are suitable and intended to be inserted into and guided in corresponding plug-in slot guides in a direction defined as the insertion direction. Accordingly, the assembly guides are about 20 to 90% in length of the recess of the lateral surface on which they are arranged, and preferably 50 to 80%. Furthermore, the assembly guides are oriented as flat elements perpendicular to the side surface they are attached to.

For the purpose of easier engagement in a plug-in slot guide, the assembly guides can have an insertion bevel on the side of the plug-in side 2, i.e. they can be beveled.

Figure 10:
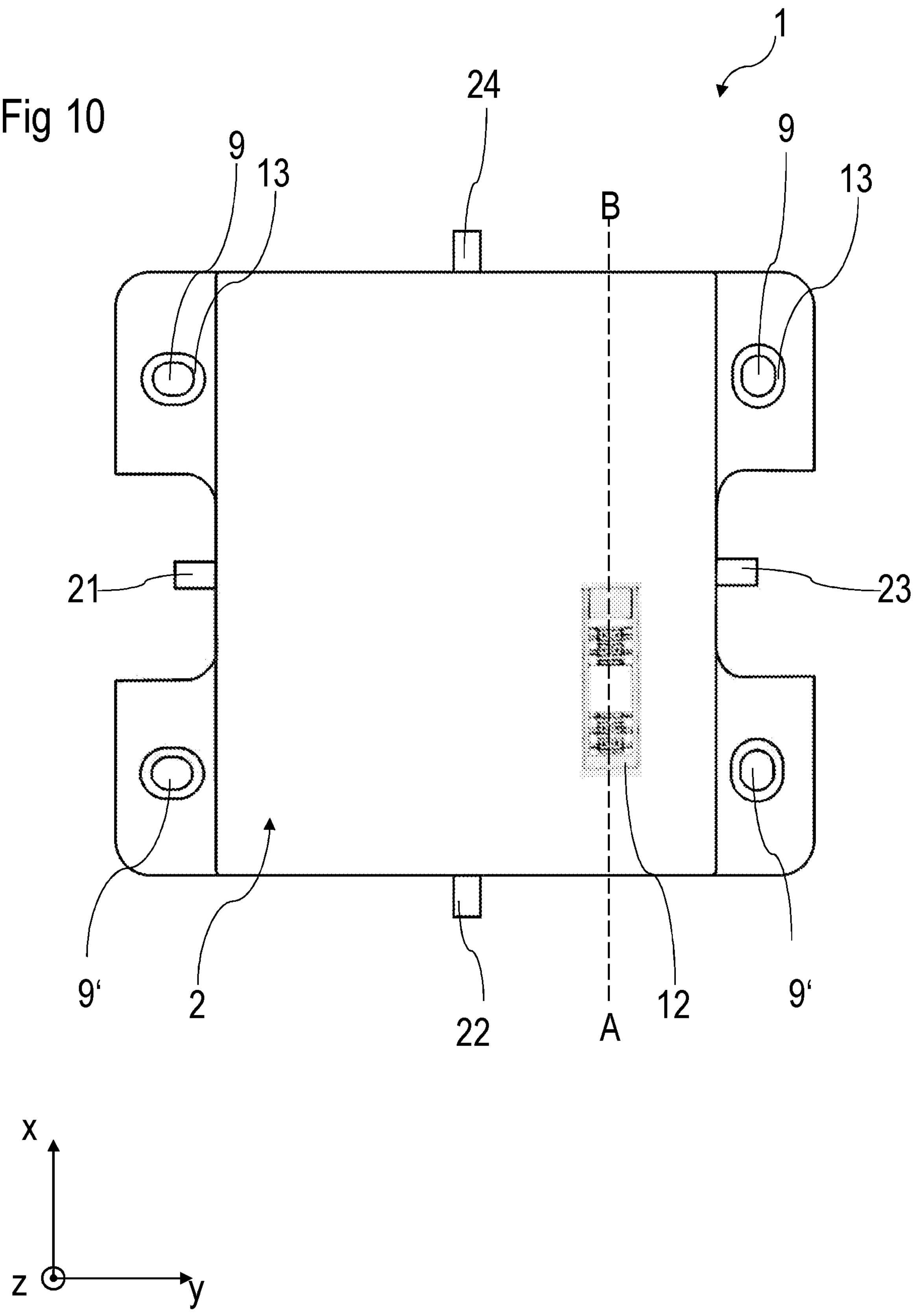
FIG. 10 shows a schematic top view of the plug-in side of the third exemplary embodiment of the housing.

FIG. 10 shows a schematic top view of the plug-in side of the third exemplary embodiment of the housing 1.

All four assembly guides 21, 22, 23, 24 can be seen here.

Figure 11:
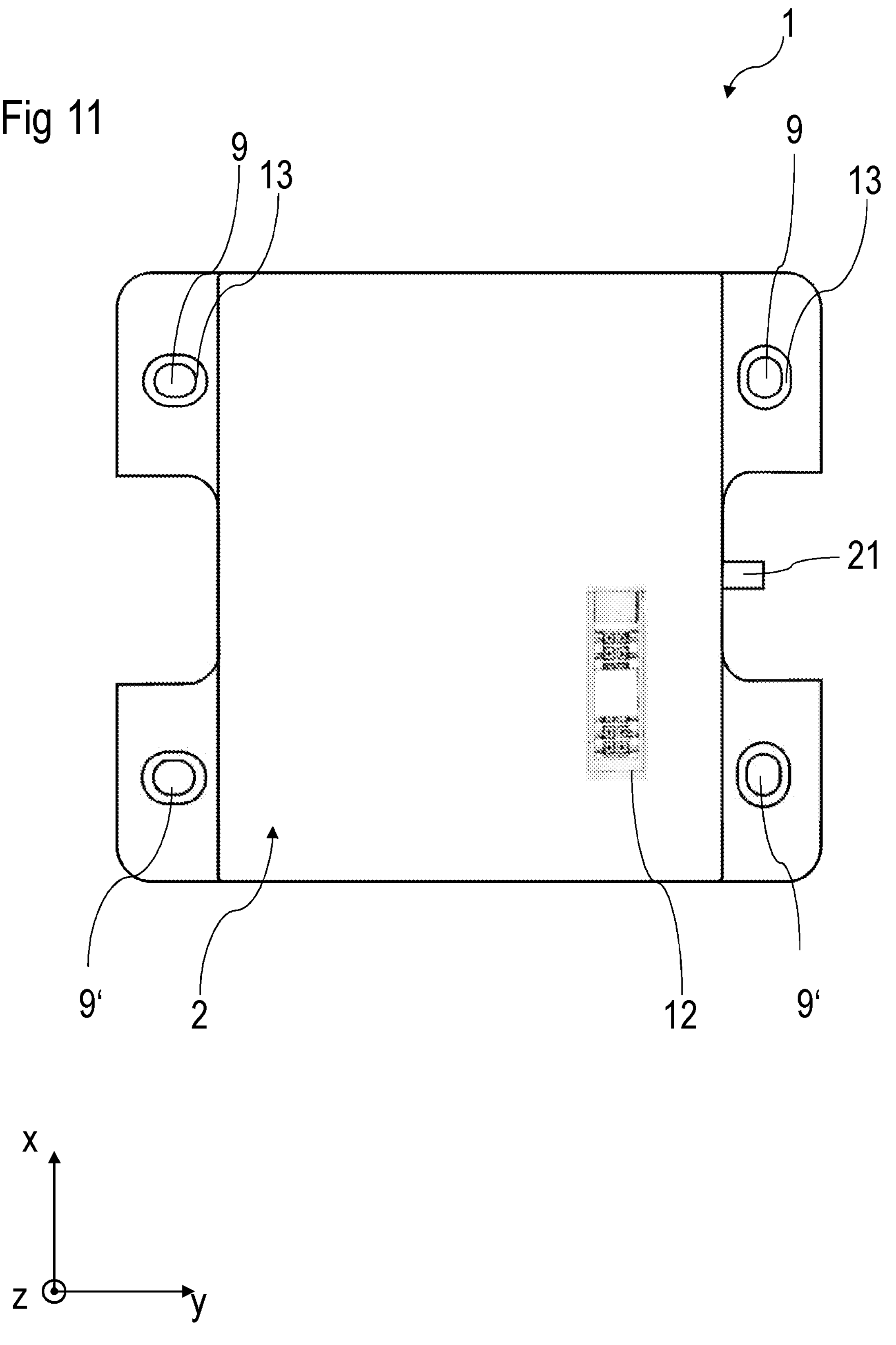
FIG. 11 shows a schematic top view of the plug-in side of a fourth exemplary embodiment of the housing.

In principle, as shown in FIG. 11 in schematic plan view on a fourth exemplary embodiment, a housing 1 with only one first assembly guide 21 according to the invention is also possible, as long as this is provided to engage in a corresponding plug-in slot guide in order to guide the housing 1 onto a plug-in slot or to bring it into a plug-in position on a carrier. Here, the single first assembly guide 21 is preferably not arranged on the first side surface 3 of the housing 1, which is the side surface with openings for load current circuit contacts in the examples used herein. Thus, the single first assembly guide 21 may be explicitly attached to the housing in addition to a shield.

Otherwise, the features of the housing 1 may correspond to those of the preceding exemplary embodiments, for example, the housing as shown in FIG. 10.

Figure 12:
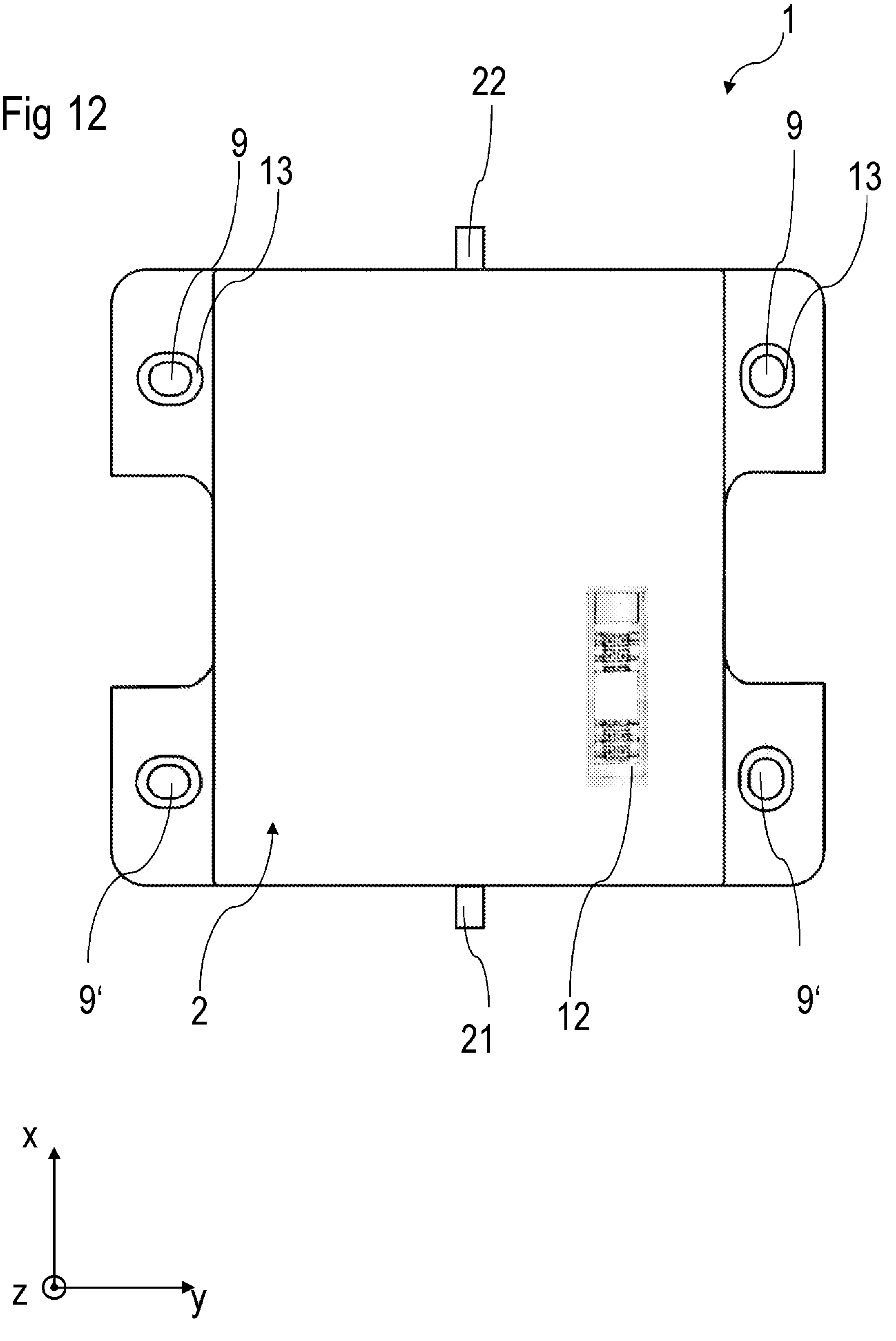
FIG. 12 shows a schematic top view of the plug-in side of a fifth exemplary embodiment of the housing.

As shown in FIG. 12, an exemplary embodiment of the housing 1 with a first assembly guide 21 and a second assembly guide 22 is also provided. Here, the first assembly guide 21 is arranged opposite the second assembly guide 22. For example, the first assembly guide 21 is arranged on the second side surface of the housing and, correspondingly, the second assembly guide 22 is arranged on the first side surface of the housing.

The advantage of two assembly guides may be that one guide is more precise and stable than in the case of only one assembly guide. However, the advantage of two assembly guides over four assembly guides may be that the number of structures and thus the weight of the housing 1 can be reduced. Also, a mold for manufacturing may be less complex.

Figure 13:
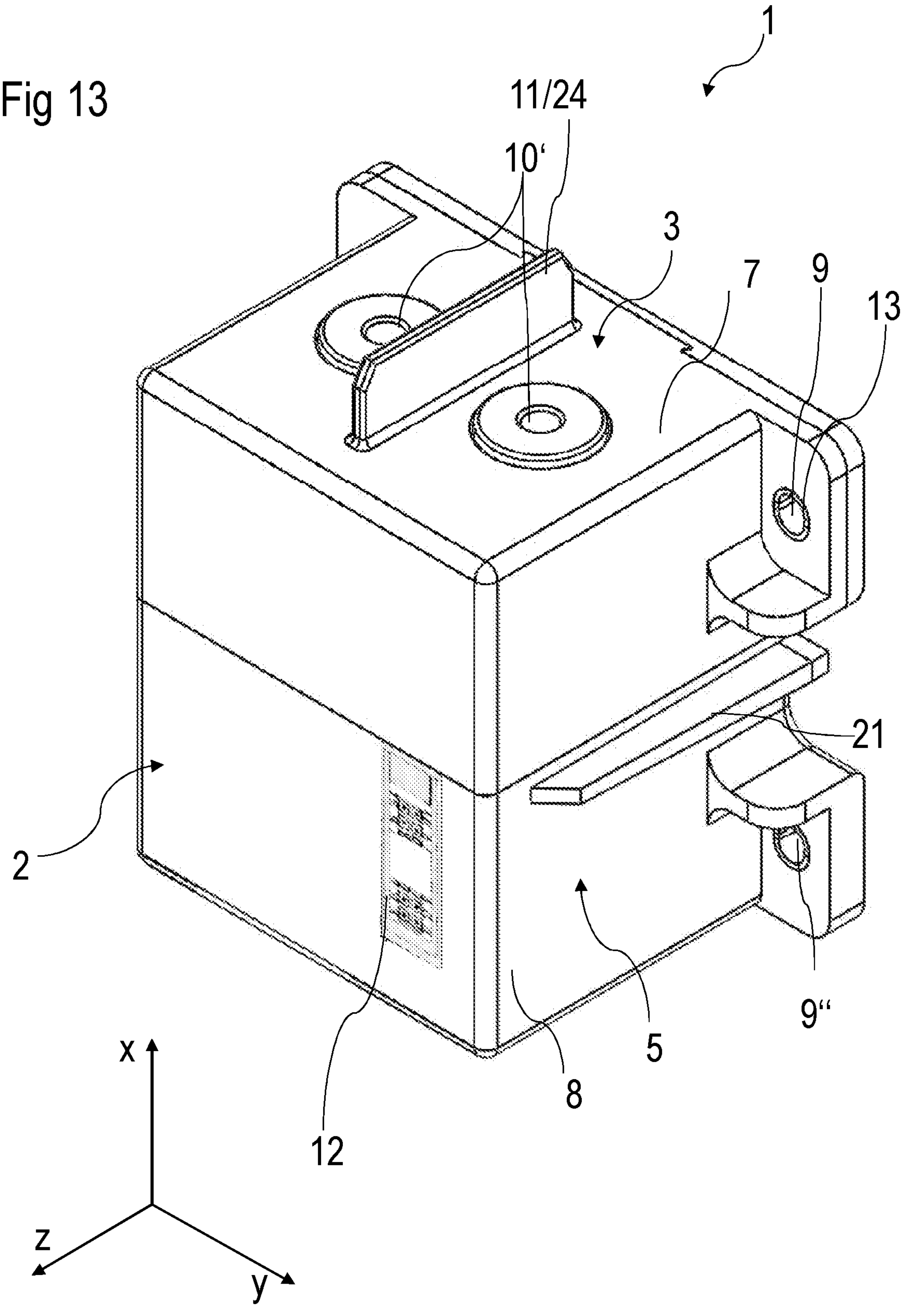
FIG. 13 shows a perspective view of a sixth exemplary embodiment of the housing enclosing an electromechanical component.
Figure 14:
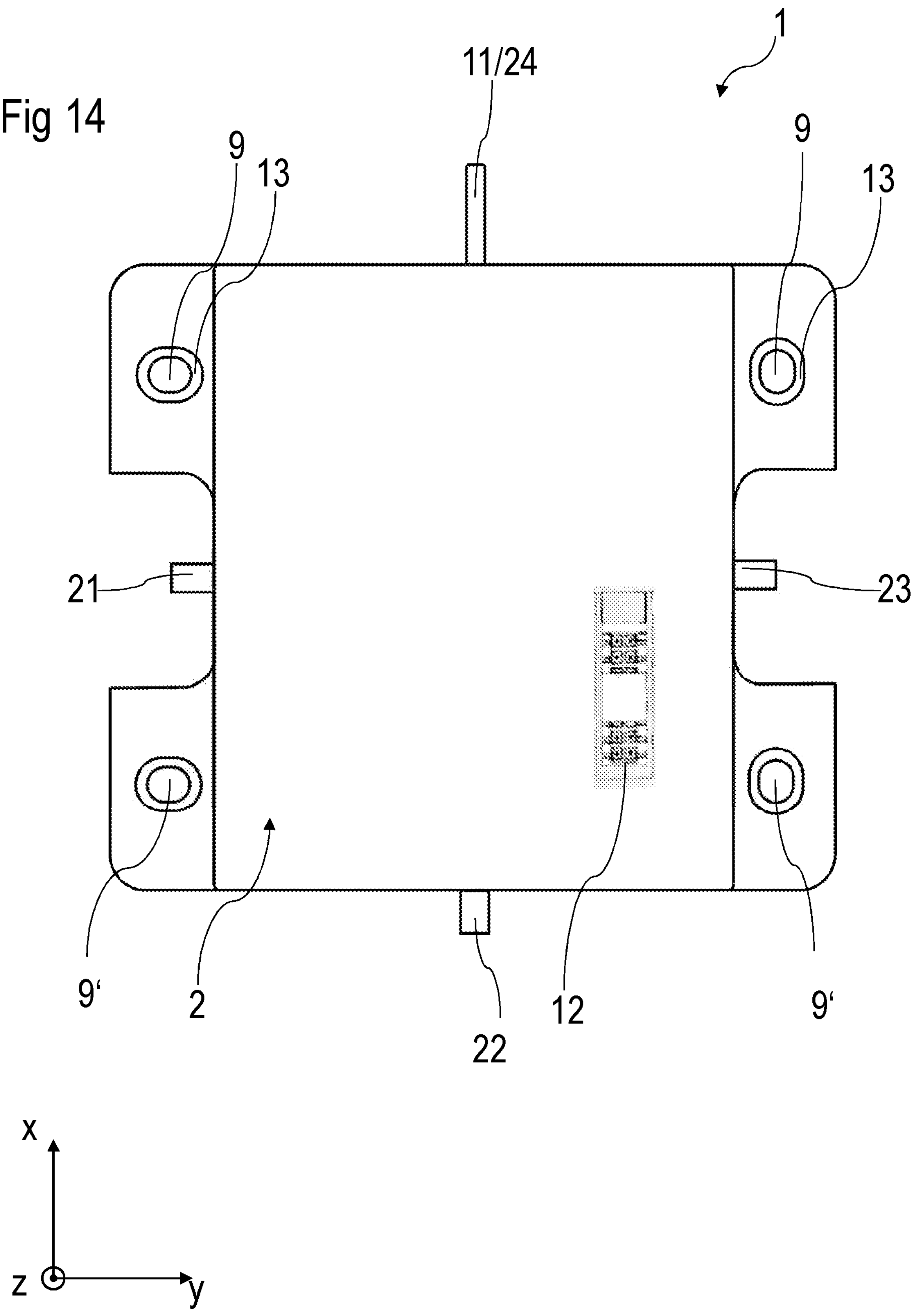
FIG. 14 shows a schematic top view of the plug-in side of the sixth exemplary embodiment of the housing.

FIGS. 13 and 14 show a sixth exemplary embodiment of a housing 1, which may largely correspond to the housing 1 shown in FIG. 9.

However, one of the assembly guides, in this case the fourth assembly guide 24, is also formed as a shield 11 at the same time. This can represent an electrical shielding between contacts, such as load current circuit contacts of a contactor.

In order to act efficiently as a shield, the fourth assembly guide 24 is more planar than the other assembly guides, for example than the first assembly guide 21. More planar in this case means that the length, i.e. in this case the extension along the first side surface, can be approximately the same as the length of the other assembly guide, but the height, i.e. in this case the x-direction, i.e. the extension in the direction normal to the first side surface, is preferably greater than for the other assembly guides.

Figure 15:
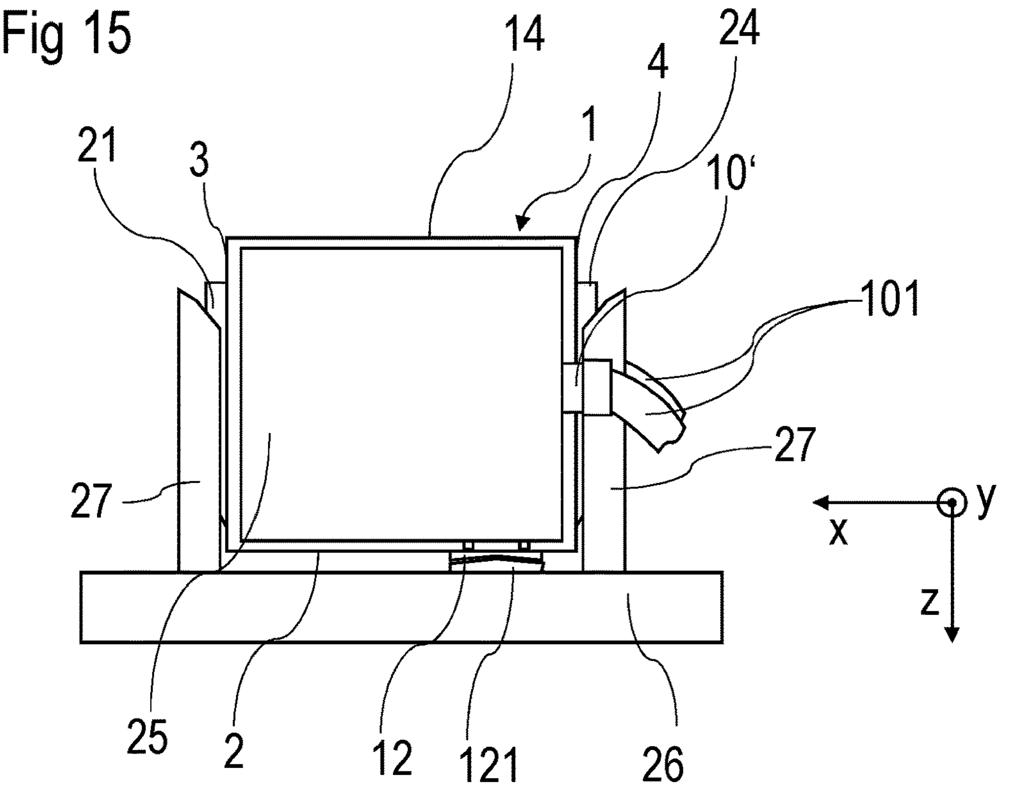
FIG. 15 shows a cross-section through an exemplary embodiment of a housing assembly.
Figure 16:
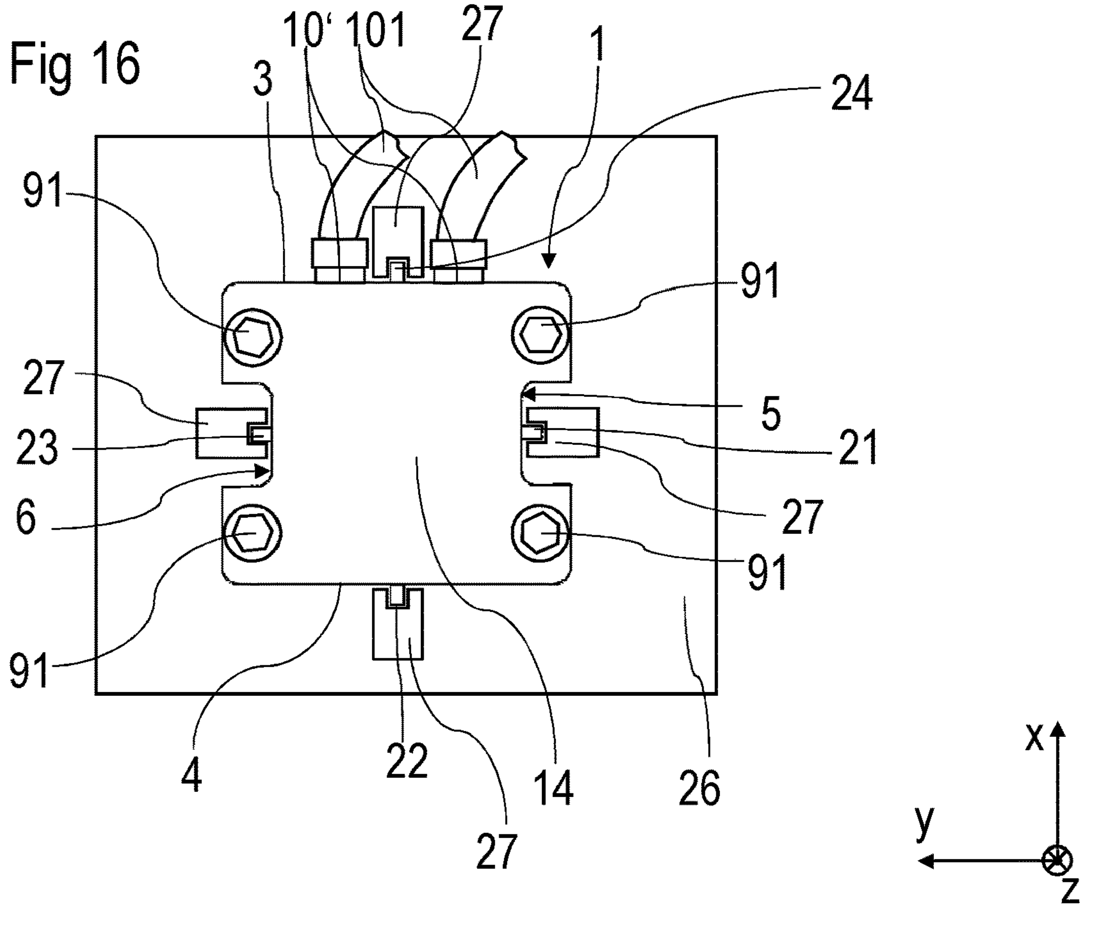
FIG. 16 shows a top view of the exemplary embodiment of the housing assembly.

FIGS. 15 and 16 each show a schematic cross-section of a housing assembly using, for example, a housing 1 as shown in FIG. 9 or FIG. 10. The cross-sectional line is indicated here in FIG. 10 by the line AB indicated there.

FIG. 16 shows a schematic top view looking at the base side of housing 1.

The cross-section in FIG. 15 is simplified in that the attachment points on the flat components of the housing 1 projecting from the housing core are not shown here in order to make the other components more visible.

The housing assembly has a carrier 26 in or on which, for example, a circuit board or printed circuit board can be arranged. Furthermore, the housing assembly has an electromechanical component 25, for example a contactor, which is arranged or enclosed in the housing 1.

In particular, it can be seen how the assembly guides 21 and 24 engage in corresponding plug-in slot guides 27, which are arranged on the carrier 26. The assembly guides 21 and 24 preferably have an insertion bevel on the side oriented towards the plug-in side 2. In this case, the plug-in slot guides 27 are also beveled, namely at the end facing away from the carrier 26. Furthermore, a notch representing the complementary shape of the plug-in slot guide to the assembly guide may be wider at the beveled end than would be necessary for a complementary shape to the assembly guide. Thus, in a pre-insertion position, which is the position in which the assembly guide starts to engage the plug-in slot guide in an insertion process, this engagement can be facilitated.

Further shown in the housing assembly shown here are the power circuit contacts 10' and power circuit cables 101, which are parts of the power circuit and to which the electromechanical component is connected.

Furthermore, the housing 1 has a plug 12 on or in the plug-in side. This plug 12 is electrically connected to the electromechanical component 25, which may in particular be a contact for a control circuit.

The plug 12 has a shape which is complementary to a counterplug 121 which is arranged on the carrier as part of the slot. Thus, an electrical connection of a control unit to the control circuit thus formed can be established.

As schematically illustrated by the corresponding triangular shape of the plug 12, an external fine guiding element can be provided and arranged on the plug 12 as part of the plug-in side 2. This engages in a fine positioning element in the slot so that the plug 12 and the counterplug 121 fit exactly into one another. Alternatively, an external fine guide can also be arranged in the vicinity of the plug in the plug-in side 2.

Thus, the basic positioning of the housing in plugged-in position can be ensured with a positioning accuracy of approximately up to 2 mm by the assembly guides 21, 22, 23 and 24 and the plug-in slot guides 27, and more precise positioning for electrical contacting can additionally be supported by the external fine guide. Thus, the plug-in side can be positioned even more precisely, facilitating efficient engagement of the plug 12 with the counterplug 121.

FIG. 16 shows a corresponding top view of the base side of the housing in the housing assembly.

The components correspond to those in FIG. 15, with the attachment points 91 additionally shown here. The attachment points 91 can correspond to the attachment points 9 or 9' from the previous examples, but here they also have screwing. These may also include washers.

These screwing can be screwed into corresponding retaining bolts, which can be arranged on the carrier.

Thus, in addition to the four mounting and plug-in slot guides, the housing 1 can be firmly fixed in a plugged-in position by the corresponding screwing.

In applications such as mobile applications, the z-direction preferably corresponds to the direction of gravity, as this allows the assembly and plug-in slot guides to absorb acceleration and deceleration forces that occur perpendicular to the direction of gravity particularly efficiently.

The invention claimed is:

1. A housing assembly comprising:
a housing having a plug-in side and enclosing an electromechanical component, the housing configured for mounting on a carrier,
wherein the housing comprises a first assembly guide configured for engaging in a first plug-in slot guide arranged on the carrier,
wherein the first assembly guide is arranged on a side surface lateral to the plug-in side of the housing,
wherein two openings for passing electrical contact elements are arranged on the side surface of the housing comprising the first assembly guide,
wherein the first assembly guide is arranged between the openings,
wherein the first assembly guide is configured for electrical shielding of the electrical contact elements in an area between the openings, and
wherein the plug-in side of the housing is guidable into a plugged-in position on the carrier by the engagement.

2. The housing assembly of claim 1, wherein the first assembly guide is shaped complementary to the first plug-in slot guide.

3. The housing assembly according to claim 1, wherein the first assembly guide is rail-shaped.

4. The housing assembly according to claim 1, wherein the first assembly guide forms a protrusion.

5. The housing assembly according to claim 1,
wherein the housing has a second assembly guide on a further side surface lying laterally with respect to the plug-in side of the housing, and
wherein the second assembly guide is configured for engaging in a second plug-in slot guide.

6. The housing assembly of claim 5, wherein the second assembly guide is disposed on a side surface of the housing opposite the first assembly guide.

7. The housing assembly according to claim 1,
wherein each of a second assembly guide, a third assembly guide and a fourth assembly guide is arranged on another side surface of the housing lying laterally with respect to the plug-in side, and
wherein each of the assembly guides is configured for engaging in matching plug-in slot guides of the carrier.

8. The housing assembly according to claim 1,
wherein an electrical plug is arranged in the plug-in side of the housing, and
wherein the electrical plug is in electrical contact with a counter-plug in the carrier.

9. The housing assembly according to claim 1,
wherein the housing has a base side arranged opposite the plug-in side, and
wherein the base side has at least two attachment points configured for being fastened to the carrier by screwing.

10. The housing assembly according to claim 1,
wherein the plug-in side comprises at least one external fine guiding element provided to engage with a first fine positioning element arranged on the carrier, and
wherein the plug-in side of the housing is even more precisely placeable in the plugged-in position on the carrier by the engagement.

11. The housing assembly according to claim 1, wherein the housing assembly is a contactor housing assembly comprising a contactor housing that houses a contactor.

12. A method for assembling the housing assembly according to claim 1, the method comprising:
bringing the housing into a pre-insertion position in which the first assembly guide begins to engage the first plug-in slot guide; and
subsequently pushing the housing into the plugged-in position along an insertion direction guided by interengaging the first assembly guide and the first plug-in slot guide.

13. The method of claim 12, wherein the insertion direction is oriented in a direction of gravity.

14. The housing assembly according to claim 1,
wherein the housing has a first housing component and a second housing component, the second housing component having a first guide groove,
wherein the first housing component has a first complementary element, the first complementary element and the first guide groove being designed such that the housing components are connectable to form the housing by sliding one inside the other along a guide direction.

15. The housing assembly according to claim 14, wherein the connection is a force-locking connection in a direction perpendicular to the guide direction.

16. The housing assembly according to claim 15, wherein the force-locking connection is supported by a shape of the first guide groove and a complementary shape of the first complementary element.

17. The housing assembly according to claim 14, further comprising a second guide groove and a second complementary element, the second complementary element being slidable into the second guide groove.

18. The housing assembly according to claim 14, further comprising a securing means effecting a fixed connection of the first and second housing components in the guide direction.

19. The housing assembly according to claim 18, wherein the securing means comprises two or more securing elements.

20. The housing assembly according to claim 19, wherein the securing elements comprise at least one hollow sleeve disposed in aligned holes in the first and second housing components.

21. The housing assembly according to claim 14, wherein, when the first and second housing components are assembled, the housing comprises at least one latch by which the first and second housing components are latched together.

22. The housing assembly according to claim 21, wherein the at least one latch is arranged on a side of the housing opposite the first guide groove.

* * * * *